US008859120B2

(12) United States Patent
Christensen et al.

(10) Patent No.: US 8,859,120 B2
(45) Date of Patent: *Oct. 14, 2014

(54) LITHIUM RESERVOIR SYSTEM AND METHOD FOR RECHARGEABLE LITHIUM ION BATTERIES

(75) Inventors: John F. Christensen, Mountain View, CA (US); Jasim Ahmed, Menlo Park, CA (US); Sungbae Park, Cupertino, CA (US); Aleksandar Kojic, Sunnyvale, CA (US)

(73) Assignee: Robert Bosch GmbH, Stuttgart (DE)

(*) Notice: Subject to any disclaimer, the term of this patent is extended or adjusted under 35 U.S.C. 154(b) by 400 days.

This patent is subject to a terminal disclaimer.

(21) Appl. No.: 12/942,439

(22) Filed: Nov. 9, 2010

(65) Prior Publication Data

US 2011/0081563 A1  Apr. 7, 2011

Related U.S. Application Data

(63) Continuation of application No. 11/767,817, filed on Jun. 25, 2007, now Pat. No. 7,846,571, which is a continuation-in-part of application No. 11/477,404, filed on Jun. 28, 2006, now Pat. No. 7,726,975.

(51) Int. Cl.
| *H01M 10/44* | (2006.01) |
| *H01M 10/058* | (2010.01) |
| *H01M 10/00* | (2006.01) |
| *H01M 6/18* | (2006.01) |
| *H01M 6/50* | (2006.01) |
| *H01M 10/0525* | (2010.01) |
| *H01M 10/48* | (2006.01) |
| *H01M 10/42* | (2006.01) |

(52) U.S. Cl.
CPC .............. *H01M 10/48* (2013.01); *H01M 10/44* (2013.01); *H01M 6/5005* (2013.01); *H01M 10/0525* (2013.01); *Y02E 60/122* (2013.01); *H01M 10/425* (2013.01); *Y02T 10/7011* (2013.01); *H01M 10/058* (2013.01)

USPC .............. 429/61; 429/50; 429/122; 429/188; 429/206

(58) Field of Classification Search
None
See application file for complete search history.

(56) References Cited

U.S. PATENT DOCUMENTS

| 2,578,027 | A | 12/1951 | Tichertor |
| 2,857,447 | A | 10/1958 | Hugo |
| 5,601,951 | A | 2/1997 | Johnson et al. |
| 5,721,067 | A | 2/1998 | Jacobs et al. |
| 6,766,817 | B2 | 7/2004 | da Silva |

(Continued)

FOREIGN PATENT DOCUMENTS

| EP | 1 577 914 | 9/2009 |
| JP | 02-309568 | 12/1990 |

(Continued)

OTHER PUBLICATIONS

Christensen et al., "Effect of anode film resistance on the charge/discharge capacity of a lithium-ion battery," Journal of the Electrochemical Society, 150 (2003) A1416.

(Continued)

*Primary Examiner* — Kwang Han
(74) *Attorney, Agent, or Firm* — Kenyon & Kenyon LLP

(57) ABSTRACT

A lithium-ion battery cell includes at least two working electrodes, each including an active material, an inert material, an electrolyte and a current collector, a first separator region arranged between the at least two working electrodes to separate the at least two working electrodes so that none of the working electrodes are electronically connected within the cell, an auxiliary electrode including a lithium reservoir, and a second separator region arranged between the auxiliary electrode and the at least two working electrodes to separate the auxiliary electrode from the working electrodes so that none of the working electrodes is electronically connected to the auxiliary electrode within the cell.

54 Claims, 9 Drawing Sheets

(56) References Cited

U.S. PATENT DOCUMENTS

| | | |
|---|---|---|
| 6,918,404 B2 | 7/2005 | da Silva |
| 7,066,586 B2 | 6/2006 | da Silva |
| 2004/0018431 A1 | 1/2004 | Gozdz et al. |
| 2006/0057433 A1 | 3/2006 | Ando et al. |
| 2006/0093871 A1 | 5/2006 | Howard et al. |

FOREIGN PATENT DOCUMENTS

| | | |
|---|---|---|
| JP | 08-190934 | 7/1996 |
| JP | 2002-050407 | 2/2002 |
| JP | 2007-240195 | 9/2007 |
| JP | 2007 299698 | 11/2007 |
| WO | WO2004/059672 | 7/2004 |
| WO | WO 2007/006121 | 1/2007 |

OTHER PUBLICATIONS

Christensen et al., "Cyclable Lithium and Capacity Loss in Li-ion Cells," Journal of the Electrochemical Society, 152 (2005) A818.

Aora et al., "Mathematical Modeling of the Lithium Deposition Overcharge Reaction in Lithium-ion Batteries Using Carbon-based Negative Electrodes," Journal of the Electrochemical Society, 146 (1999) 3543.

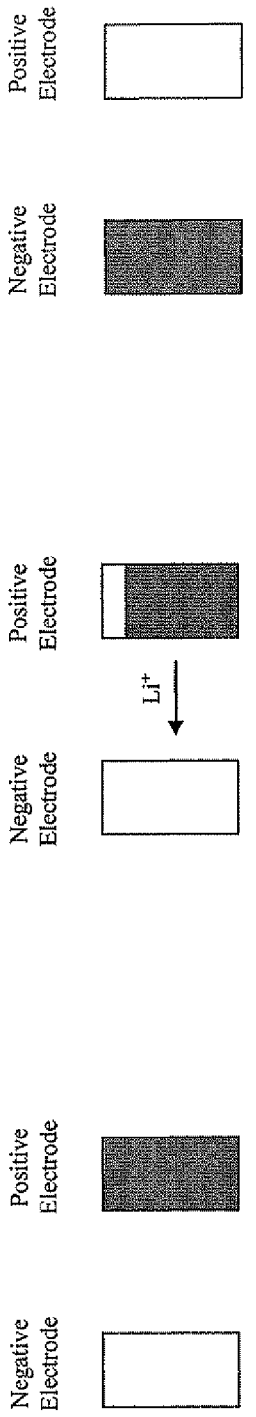
Figure 2A
Initial (discharged) state of cell
Main Reactions:
$Li^+ + e^- + N \rightarrow LiN$    $LiP \rightarrow Li^+ + e^- + P$
Cell during charge
Figure 2B
Figure 2C
Charged state of cell
Main Reactions:
$LiN \rightarrow Li^+ + e^- + N$    $Li^+ + e^- + P \rightarrow LiP$
Cell during discharge
Figure 2D
Figure 2E
Final (discharged) state of cell

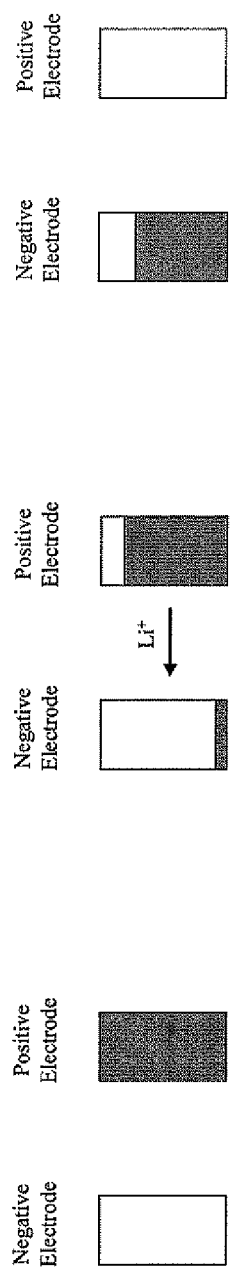
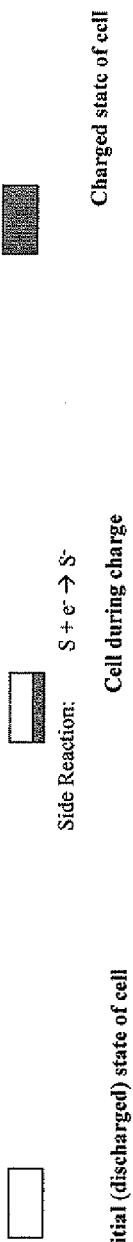
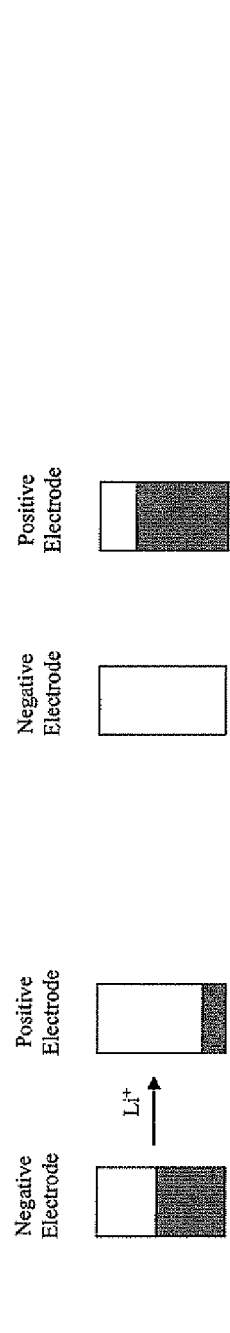
Figure 3A — Initial (discharged) state of cell
Figure 3B — Cell during charge
Main Reactions: Li$^+$ + e$^-$ + N → LiN ; LiP → Li$^+$ + e$^-$ + P
Side Reaction: S + e$^-$ → S$^-$
Figure 3C — Charged state of cell
Figure 3D — Cell during discharge
Main Reactions: LiN → Li$^+$ + e$^-$ + N ; Li$^+$ + e$^-$ + P → LiP
Figure 3E — Final (discharged) state of cell

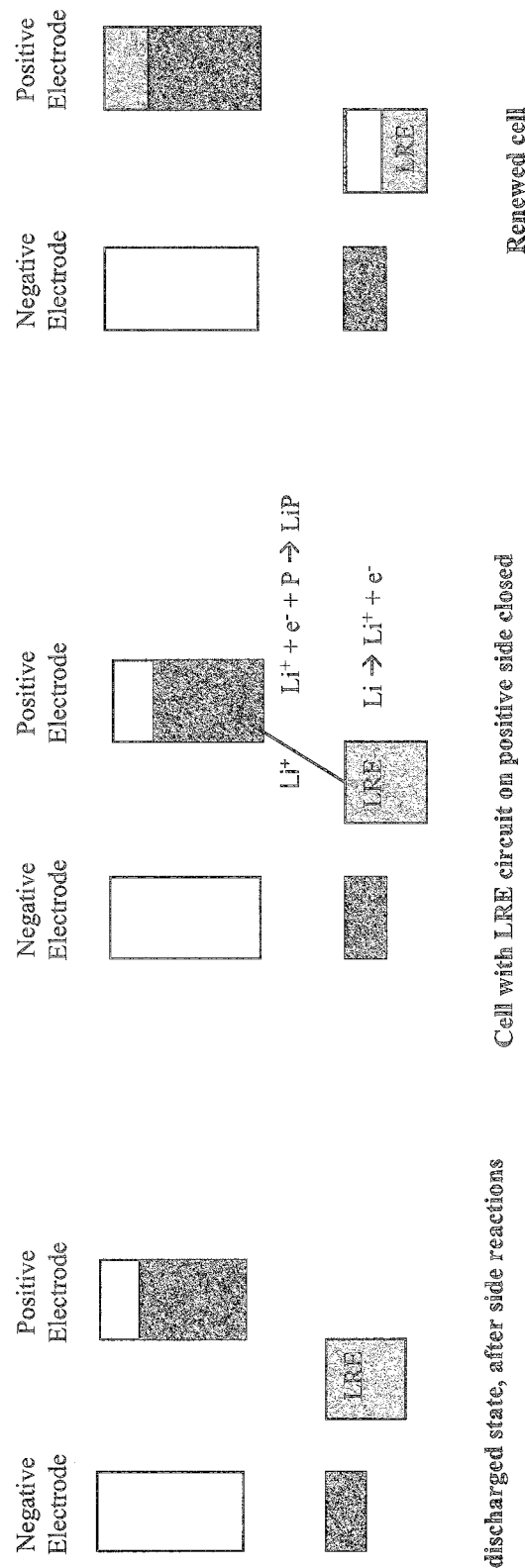

| Negative Electrode | Positive Electrode | | Negative Electrode | Positive Electrode |

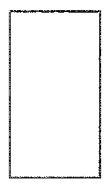       

       

Cell in discharged state, after side reactions

Figure 8A

Cell in discharged state, after anode material loss

Figure 8B

Negative Electrode     Positive Electrode        Negative Electrode     Positive Electrode

  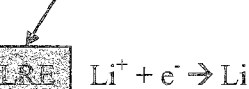

$LiP \rightarrow Li^+ + e^- + P$ $Li^+ + e^- \rightarrow Li$

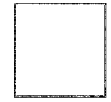 

 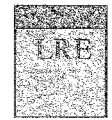

Cell with voltage applied between positive electrode and LRE

Figure 8C

Rebalanced cell.

Figure 8D

LITHIUM RESERVOIR SYSTEM AND METHOD FOR RECHARGEABLE LITHIUM ION BATTERIES

CROSS-REFERENCES TO RELATED APPLICATIONS

This application is a continuation application of, and claims priority under 35 U.S.C. §120 to, U.S. patent application Ser. No. 11/767,817, filed on Jun. 25, 2007 now U.S. Pat. No. 7,846,571, which is a continuation-in-part application of U.S. patent application Ser. No. 11/477,404, filed on Jun. 28, 2006 now U.S. Pat. No. 7,726,975, all of which are incorporated herein by reference in their entireties.

FIELD OF THE INVENTION

The present invention relates to a method and system to replenish lithium-ion battery capacity that is lost due to side reactions over the battery's lifetime and to store excess capacity.

BACKGROUND INFORMATION

The capacity of a lithium-ion battery may decrease over its lifetime due to a loss of the active material and/or consumption of charge via side reactions. Efforts have been made to decrease the loss of capacity via the discovery of improved materials.

Rechargeable lithium-ion batteries may be an attractive energy storage system for portable electronics and hybrid-electric vehicles because of their high energy density and rate capability. Such batteries, however, may experience degradation, which may limit their useful life. In particular, rechargeable lithium-ion batteries may experience a decrease in useable capacity (that is, "capacity fade") and/or an increase in the internal resistance of the battery (that is, "power fade"). Here, the capacity fade may result from degradation or loss of the active material that serves as a host to the lithium ions in the working electrodes of the battery, or from loss of capacity due to side reactions at one or both of the working electrodes.

Other prior cells have been designed to compensate for first-cycle lithium loss during solid electrolyte interphase (SEI) formation, which itself may be a side reaction. In addition, U.S. Pat. No. 6,335,115, entitled "Secondary Lithium-ion Cell with an Auxiliary Electrode" (herein referred as "the Meissner reference") discusses the use of an auxiliary lithium electrode that purportedly compensates for lithium loss throughout the life of the cell. In particular, the Meissner reference refers to ionic isolation and electronic isolation to isolate an auxiliary electrode from the working electrodes. According to the Meissner reference, ionic isolation involves an orientation of the battery in which the lithium-ion containing electrolyte contacts the two working electrodes, but not the auxiliary electrode. The auxiliary lithium electrode is presumably always in electronic contact with one of the working electrodes, but replenishment of lithium to the depleted working electrode does not occur until the cell is reoriented such that the electrolyte is in contact with both the working electrode and the auxiliary electrode.

The use of an auxiliary lithium electrode as discussed in the Meissner reference cannot be practically implemented in a lithium-ion battery because the battery design would require that the electrolyte not completely fill the pores of the separator and working electrodes. However, the porous separator could act as a wick to transport the electrolyte to the region of the separator that contacts the auxiliary electrode. Even residual electrolyte in the pores of this region of the separator would allow transport of lithium from the auxiliary electrode to the working electrode. Lithium transfer would continue until the potentials of the working and auxiliary electrodes equilibrated. Excessive lithium transfer beyond the point of capacity balance between the two working electrodes would result in reduction of the cell's capacity. (See Christensen et al, "Effect of anode film resistance on the charge/discharge capacity of a lithium-ion battery," Journal of the Electrochemical Society, 150 (2003) A1416 (hereinafter referred to as "Christensen I"), and Christensen et al., "Cyclable Lithium and Capacity Loss in Li-ion Cells," Journal of the Electrochemical Society, 152 (2005) A818 (hereinafter referred to as "Christensen II")). Moreover, shorting of the auxiliary-electrode-working-electrode circuit via imperfect ionic isolation would lead to rapid transfer of lithium to the working electrode and possible deposition of lithium on the electrode surface. Such lithium deposition may pose a safety risk and/or degrade the cell because the lithium metal reacts rapidly and exothermically with the organic solvent used in the electrolyte. (See Aora et al., "Mathematical Modeling of the Lithium Deposition Overcharge Reaction in Lithium-ion Batteries Using Carbon-based Negative Electrodes," Journal of the Electrochemical Society, 146 (1999) 3543).

Even if it were possible to maintain ionic isolation of the auxiliary electrode until lithium transfer is required, the cell design referred to by the Meissner reference would require additional electrode and separator material that is unutilized. Moreover, lithium transport between the two working electrodes of the cell would not be possible if the orientation of the cell were such that the two working electrodes are not in ionic contact. Indeed, even if the above-discussed concerns were addressed, relying upon reorientation of the battery significantly reduces the number of potential applications. For example, if battery-powered devices such as power tools are used in more than one orientation the auxiliary-electrode-working-electrode circuit could close unintentionally during the operation of the battery. Accordingly, the approach advocated by the Meissner reference is limited to applications having a fixed orientation.

In regards to electronic isolation, the Meissner reference requires that the lithium auxiliary electrode be placed between the positive and negative electrodes. However, such placement of the lithium auxiliary electrode would reduce the uniformity of the current distribution, and therefore the rate capability of the cell, when transferring lithium from one working electrode to the other. The Meissner reference may also require that the auxiliary electrode be connected to a metallic jacket.

SUMMARY OF THE INVENTION

The present invention relates to a method and system to replenish lithium-ion battery capacity that is lost due to side reactions and/or other capacity that is lost over the battery's lifetime, and to store excess capacity, e.g., that could otherwise be detrimental to the system. In this regard, an exemplary embodiment and/or exemplary method of the present invention may address certain defects inherent in other prior methods for lithium compensation, and may provide certain improvements over the other prior methods.

According to an exemplary embodiment and/or exemplary method of the present invention, lithium-ion capacity that is lost due to side reactions over the battery's lifetime is replenished using an additional lithium electrode, which serves as lithium reservoir to replace the lost charge to one or both working electrodes of the battery. Further, excess capacity may be removed and stored in the additional lithium electrode, in particular when such excess capacity poses a risk of battery degradation or a safety risk.

The additional lithium electrode may serve as a lithium reservoir that can be used to replace charge or remove charge from either working electrode as capacity is lost over the battery's life. A circuit between the additional lithium electrode and the working electrode(s) can be closed so that the lithium may be transferred from the additional lithium electrode to the working electrode(s). An arrangement may be provided to polarize the working electrode/lithium electrode pair and control the current flow direction in order to drive lithium from the working electrode to the additional lithium electrode.

In this regard, to overcome the difficulties in determining the precise amount of lithium to be transferred to or from the working electrodes, and thereby avoid the risks of inserting too much lithium into the working electrodes which can degrade the cell and pose a safety hazard or removing too much lithium which can unnecessarily limit the battery's capacity, the exemplary embodiment and/or exemplary method of the present invention uses the additionally provided lithium reservoir electrode (LRE) as a reference electrode to measure the open-circuit potential (OCP) of each working electrode thereby making known the state of charge (SOC) of each electrode. Once the state of charge (SOC) of each electrode is known, the appropriate amount of lithium can be transferred from the lithium reservoir electrode (LRE) and inserted into one or both working electrodes and vice versa.

According to an exemplary embodiment and/or exemplary method of the present invention, the state of charge (SOC) of each electrode is determined by measuring the full-cell potential and/or current, and applying these measurements to a model of the cell to calculate the state of charge (SOC) of each working electrode.

According to an exemplary embodiment and/or exemplary method of the present invention, an exemplary lithium-ion cell is provided, which includes three terminals—two working terminals and a lithium reservoir electrode (LRE) terminal. The working terminals include a negative electrode terminal and a positive electrode terminal. The exemplary lithium-ion cell may be manufactured in any configuration, including, for example, such configurations as a spirally wound configuration and a prismatically stacked configuration.

According to an exemplary embodiment and/or exemplary method of the present invention, uniformity of the current distribution is maintained when transferring lithium from one working electrode to the other by electronically isolating the lithium reservoir electrode (LRE) from the working electrodes such that the lithium reservoir electrode (LRE) is arranged outside of the current path between the two working electrodes.

According to an exemplary embodiment and/or exemplary method of the present invention, the amount and rate of lithium transfer is controlled via a battery monitoring system to prevent, or at least minimize, formation of dendrites at the lithium reservoir electrode (LRE) during lithium removal from the working electrodes, or to prevent, or at least minimize an excessive transfer of lithium which may pose a safety risk and degrade the cell via lithium deposition during lithium insertion into the working electrodes. In this regard, when replacing lost capacity of the battery cell, the battery monitoring system may enhance battery life.

Hence, the exemplary embodiment and/or exemplary method of the present invention provides a battery that replaces lost capacity and/or removes excess lithium from one or both of the working electrodes using a lithium reservoir and an effective monitoring and control system.

According to an exemplary embodiment and/or exemplary method of the present invention, a metallic jacket is not required for connection to an auxiliary electrode.

BRIEF DESCRIPTION OF THE DRAWINGS

FIG. 2A shows an exemplary discharged state of a lithium-ion battery cell prior to charging.

FIG. 2B shows an exemplary charging state of a lithium-ion battery cell, in which there are no side reactions.

FIG. 2C shows an exemplary charged state of a lithium-ion battery cell, in which there are no side reactions.

FIG. 2D shows an exemplary discharging state of a lithium-ion battery cell, in which there are no side reactions.

FIG. 2E shows an exemplary discharged state of a lithium-ion battery cell, in which there are no side reactions.

FIG. 3A shows an exemplary discharged state of a lithium-ion battery cell, in which no side reactions occurred during a previous charging or discharging of the lithium-ion battery cell.

FIG. 3B shows an exemplary charging state of a lithium-ion battery cell, in which an irreversible side reaction occurs at the negative electrode during the charging of the lithium-ion battery cell.

FIG. 3C shows an exemplary charged state of a lithium-ion battery cell, in which an irreversible side reaction occurred at the negative electrode during the charging of the lithium-ion battery cell.

FIG. 3D shows an exemplary discharging state of a lithium-ion battery cell, in which an irreversible side reaction occurred at the negative electrode during the charging of the lithium-ion battery cell.

FIG. 3E shows an exemplary discharged state of a lithium-ion battery cell, in which an irreversible side reaction occurred at the negative electrode during the charging of the lithium-ion battery cell.

FIG. 7A shows an exemplary lithium-ion cell and corresponding lithium reservoir electrode (LRE) in a discharge state, after side reactions have occurred.

FIG. 7B shows the exemplary lithium-ion cell and corresponding lithium reservoir electrode (LRE), in which a closed electronic circuit has been applied between the lithium reservoir (LRE) and the positive electrode of the exemplary lithium-ion cell.

FIG. 7C shows the exemplary lithium-ion cell in a renewed state after the closed electronic circuit has been applied between the lithium reservoir (LRE) and the positive electrode of the exemplary lithium-ion cell.

FIG. 8A shows an exemplary lithium-ion cell and corresponding lithium reservoir electrode (LRE) in a discharge state, after side reactions have occurred.

FIG. 8B shows the exemplary lithium-ion cell and corresponding lithium reservoir electrode (LRE) in the discharged state, after anode material loss.

FIG. 8C shows the exemplary lithium-ion cell and corresponding lithium reservoir electrode (LRE), in which a voltage has been applied between the lithium reservoir (LRE) and the positive electrode of the exemplary lithium-ion cell.

FIG. 8D shows the exemplary lithium-ion cell in a rebalanced state after transfer of lithium from the lithium reservoir (LRE) to the positive electrode of the exemplary lithium-ion cell.

DETAILED DESCRIPTION

Figure 1:
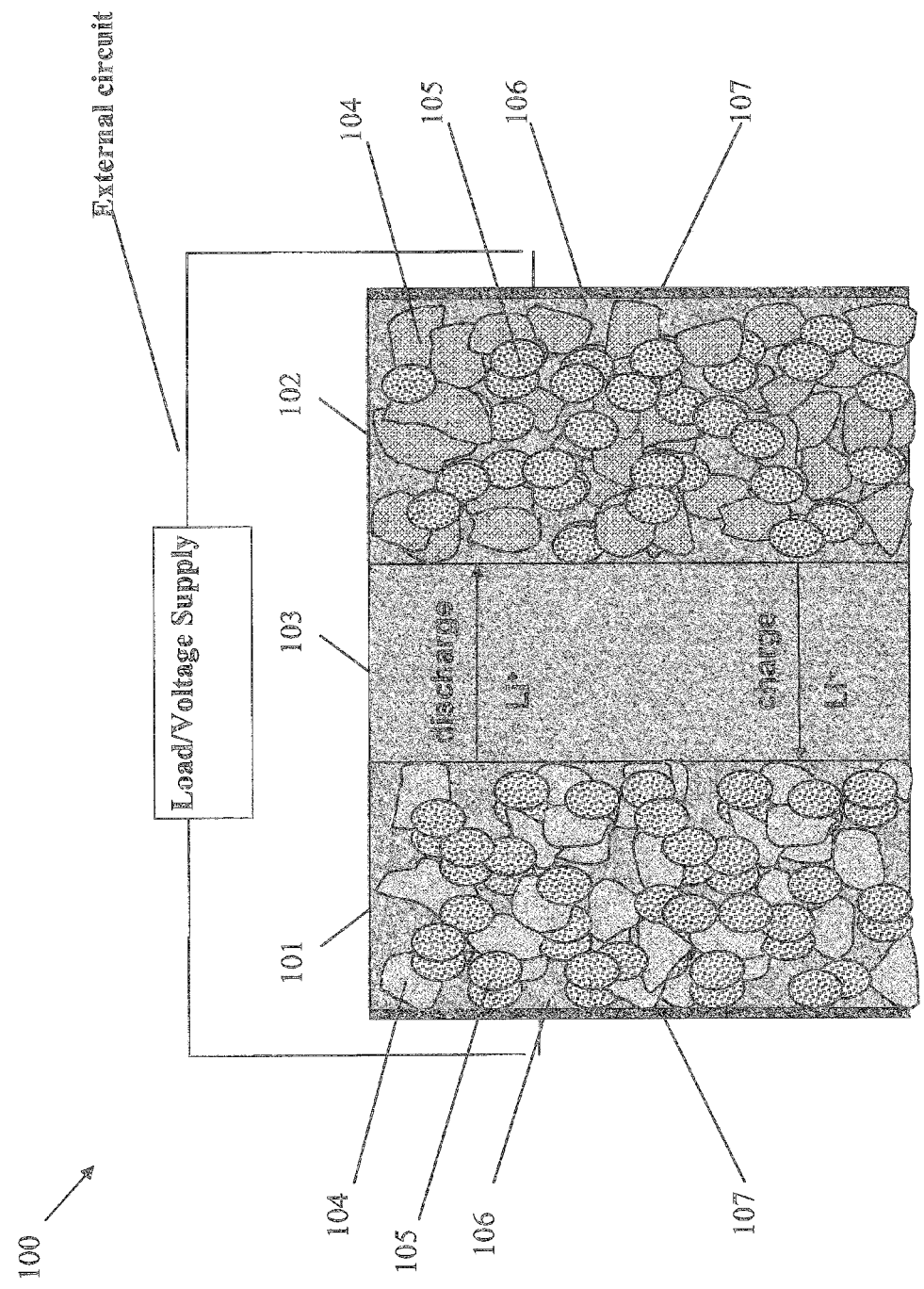
FIG. 1 shows a "conventional" lithium-ion battery cell.

FIG. 1 shows a "conventional" lithium-ion cell 100, which includes a negative electrode 101, a positive electrode 102 and a separator region 103 between the negative electrode 101 and the positive electrode 102. The negative electrode 101 and the positive electrode 102 each includes active materials 104 into which lithium can be inserted, inert materials 105, electrolyte 106 and a current collector 107. The separator region 103 includes an electrolyte with a lithium cation, and serves as a physical barrier between the negative electrode 101 and the positive electrode 102 so that the electrodes are not electronically connected within the cell 100.

During charging, there is a generation of electrons at the positive electrode 102 and consumption of an equal amount of electrons at the negative electrode 101. The electrons are transferred via an external circuit. In an ideal operation of the cell 100, the electrons are generated at the positive electrode 102 because there is an extraction of lithium ions from the active material 104 of the positive electrode 102, and the electrons are consumed at the negative electrode 101 because there is an insertion of lithium ions into the active material 104 of the negative electrode 101. During discharge, the opposite reactions occur.

The transfer of lithium can be described by certain main charge-transfer reactions that occur at the positive and negative electrodes 102, 101. For example, if P represents the positive electrode material and N the negative electrode material, the main charge-transfer reactions that occur at the negative electrode 101 and the positive electrode 102 during charge may be represented, respectively, as follows:

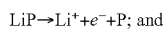

$$\text{LiP} \rightarrow \text{Li}^+ + e^- + \text{P}; \text{ and}$$

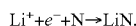

$$\text{Li}^+ + e^- + \text{N} \rightarrow \text{LiN}.$$

Here LiP and LiN are the positive and negative electrode materials, respectively, intercalated with lithium. For discharging, these reactions proceed in the opposite direction.

FIGS. 2A to 2E show the charge and discharge of a lithium-ion cell in which there are no side reactions. In particular, in the discharged state of the cell, as shown in FIG. 2A, lithium exists in the positive electrode (represented by shading) but not in the negative electrode. During charge, as shown in FIG. 2B, lithium is transferred from the positive electrode to the negative electrode. Upon reaching the charged stated, as shown in FIG. 2C, all of the lithium has been transferred to the negative electrode. During a subsequent discharge, as shown in FIG. 2D, the opposite reactions occur, and the lithium is transferred from the negative electrode to the positive electrode. Upon reaching the discharged state, as shown in FIG. 2E, all of the lithium has been transferred to the positive electrode.

In an ideal operation of the cell, the main charge-transfer reactions are the only charge-transfer reactions that occur, and are fully reversible. For non-ideal cells, however, some charge may be consumed via a side reaction, which results in a permanent capacity loss if the side reaction is not fully reversible. In this instance, a side reaction is defined as a charge-transfer reaction that does not involve an insertion or extraction of lithium ions into or out of the active material. For example, a side reaction may involve the decomposition of the solvent or the formation of the solid electrolyte interphase (SEI) at the negative electrode.

FIGS. 3A to 3E show the charge and discharge of a lithium-ion cell, in which an irreversible side reaction occurs at the negative electrode during charge, which consumes electrons that ideally should be consumed by the main reaction. In FIG. 3B, S is a generic reactant that may represent, for example, the solvent, anion, or a contaminant. The product S⁻ may be soluble in the electrolyte or can form a solid precipitate with the lithium cation. Because the side reaction is irreversible, the reverse reaction does not occur during discharge, and hence the charge is only partially transferred back to the positive electrode. The small box below the negative electrode box represents the charge that is consumed via the side reaction. Here, the small box is shaded to indicate that some of the charge has been consumed irreversibly. Since the charge is conserved the total area of the shaded regions remains constant.

The charge and discharge shown in FIGS. 3A to 3E illustrate the effect of an irreversible side reaction. However, a side reaction may be partially reversible, in which case a portion of the charge consumed by the side reaction is returned to the positive electrode.

The capacity of the cell is proportional to the number of electrons that are reversibly transferred from one electrode to the other electrode via the external circuit. Accordingly, as seen from FIGS. 3A to 3E, side reactions can reduce a cell's capacity.

The balance of side reactions can lead to insertion of excess lithium into one or both of the electrodes 101 and 102. (See Christensen I, equation 10.)

Figure 4:
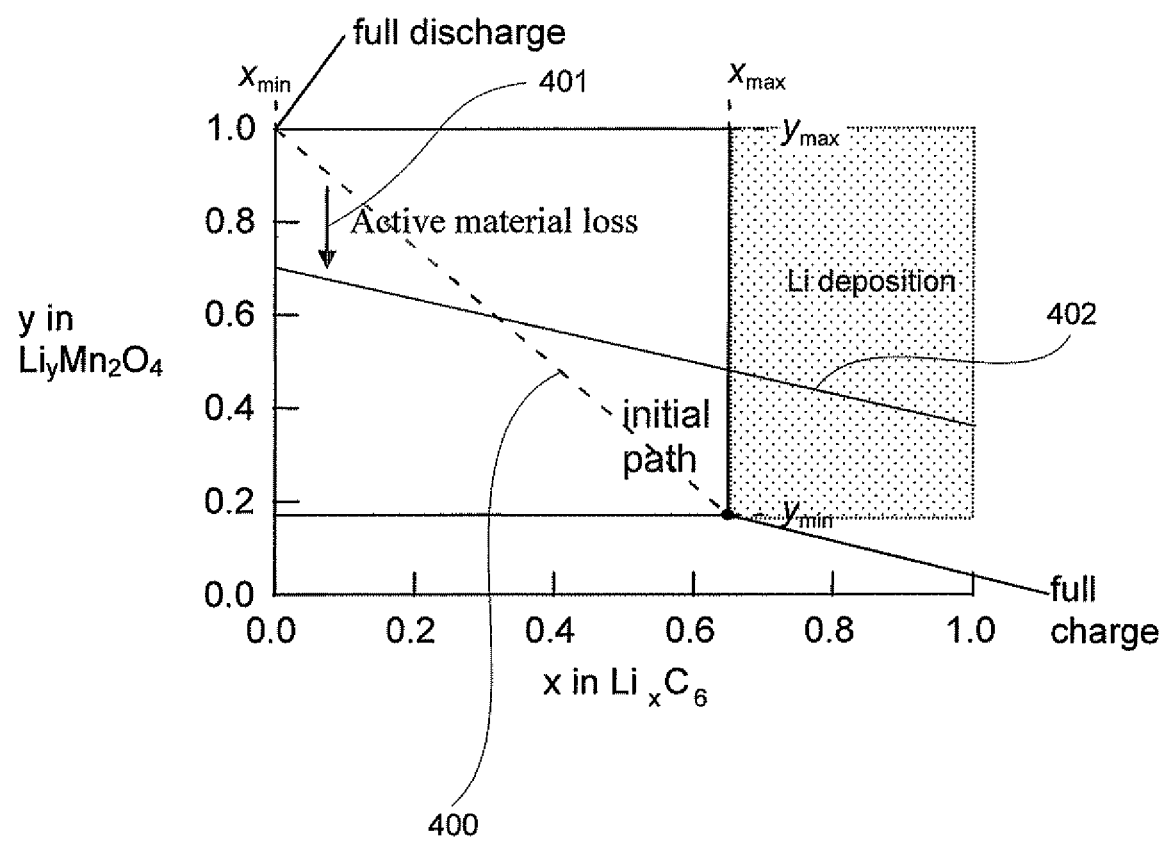
FIG. 4 is a graph plotting cycle paths for a lithium-ion cell and showing a change in the path due to active material degradation or loss.

Additionally, capacity fade due to active material degradation or loss can occur in either of the electrodes 101 and 102. (See Christensen II.) FIG. 4 is a graph plotting the charge at the positive electrode 102 against the charge at the negative electrode 101 and showing an effect of the degradation or loss of active material at the negative electrode 101 to the slope of a line representing the cycle path of the state-of-charge. (See Christensen II.)

In FIG. 4, an initial path 400 begins at $X_{min}, Y_{max}$ at a full discharge state and ends at $X_{max}, Y_{min}$ at a full charge state, where $X_{min}$ is the minimum average fraction of used lithium sites of the exemplary active material $Li_xC_6$ of the negative electrode 101, $X_{max}$ is the maximum average fraction of used lithium sites of the active material of the negative electrode 101 before detrimental lithium deposition begins to occur at the negative electrode 101, $Y_{max}$ is the maximum average fraction of used lithium sites of the exemplary active material $Li_yMn_2O_4$ of the positive electrode 102, and is the minimum average fraction of used lithium sites of the active material of the positive electrode 102. A shift 401 in the paths from initial path 400 to path 402, which includes a change in slope, represents the active material loss at the negative electrode 101. Path 402 shows the need for a higher average fraction of used lithium sites than $X_{max}$ for insertion into the negative electrode 101 of all of the lithium from the positive electrode 102 during charge.

After such degradation or loss of active material at the negative electrode 101, the likeliness of deposition of lithium at the negative electrode 101 during charging is increased. Lithium deposition poses a safety risk and the cell cannot be safely charged at high rates after the deposition. For this reason, lithium-ion cells with graphitic negative electrodes are routinely assembled with oversized negative electrodes. However, the excess capacity can be compromised through loss of active material.

Figure 5:
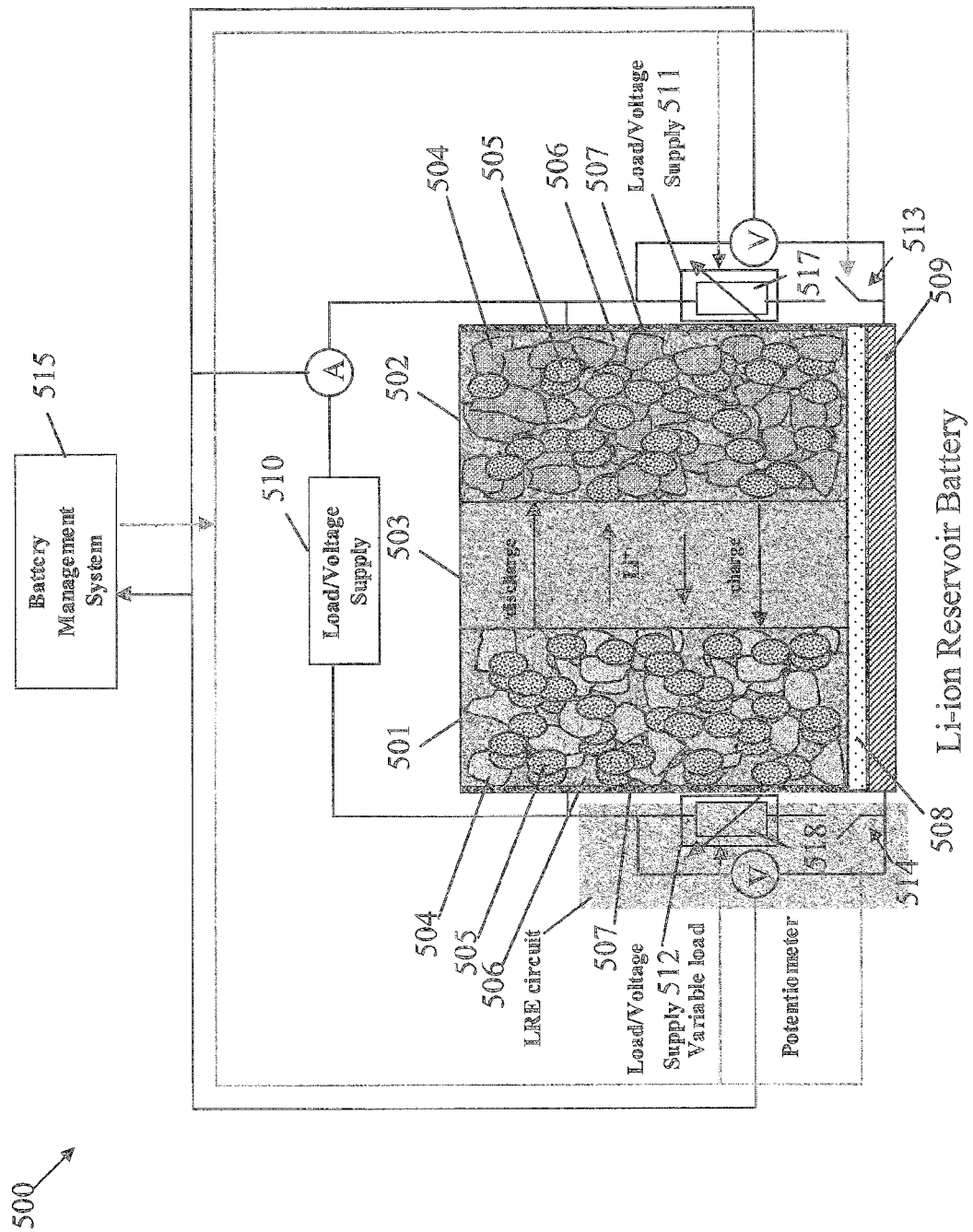
FIG. 5 shows an exemplary rechargeable lithium-ion cell, which includes a lithium reservoir electrode (LRE) configured as a reference electrode.

FIG. 5 shows an exemplary rechargeable lithium-ion cell 500, which includes a lithium reservoir electrode (LRE) 509 configured as a reference electrode. In addition to the lithium reservoir electrode (LRE) 509, the exemplary rechargeable lithium-ion cell 500 includes a negative electrode 501, a positive electrode 502, a separator region 503 between the negative electrode 501 and the positive electrode 502, and a separator region 508 between the working electrodes 501, 502 and the lithium reservoir electrode (LRE) 509.

The negative electrode 501 and the positive electrode 502 each contains active materials 504 into which lithium may be inserted. Hence, the active materials 504 are also referred to as lithium-insertion materials 504. With respect to the negative electrode 501, the active materials 504 may include, for example, graphite, disordered carbon, and/or lithium titanate. With respect to the positive electrode 502, the active materials 504 may include, for example, a transition metal oxide (e.g., lithium manganese oxide), and/or a lithium metal phosphate (e.g., lithium iron phosphate).

The negative electrode 501 and the positive electrode 502 each also includes inert materials 505, electrolyte 506, and a current collector 507. The inert materials 505 may include, for example, a polymeric binder (e.g., polyvinyldifluoride (PVDF)) and/or a carbon additive for conduction (e.g., acetylene black, graphite and/or carbon fiber). The electrolyte 506 may include, for example, Lithium Hexafluorophosphate (LiPF6) in a nonaqueous electrolyte, a cyclic carbonate (e.g., ethylene carbonate, propylene carbonate), a linear carbonate (e.g., dimethyl carbonate, ethyl methyl carbonate, diethyl carbonate), an organic solvent (e.g., acetonitrile), and/or a polymer electrolyte (e.g., polyethylene oxide). The current collector 507 may include, for example, copper for the negative electrode 501, and aluminum for the positive electrode 502. Additionally, the lithium reservoir electrode (LRE) 509 may be attached to a platinum wire current collector.

The separator region 503 between the negative electrode 501 and the positive electrode 502 serves as a physical barrier between the negative electrode 501 and the positive electrode 502 so that neither electrode is electronically connected within the cell 500. The separator region 503 includes, for example, an electrolyte with a lithium cation. The electrolyte may enable lithium-ion transfer between the positive and negative electrodes 502, 501. If a liquid electrolyte is used, the separator region 503 may include, for example, polyethylene and/or polypropylene. If a solid electrolyte is used, the separator region 503 may include, for example, a polymer electrolyte. A gelled electrolyte (mixture of liquid and solid) may also be provided.

The separator region 508 between the working electrodes 501, 502 and the lithium reservoir electrode (LRE) 509 serves as a physical barrier between the negative electrode 501 and the lithium reservoir electrode (LRE) 509, and between the positive electrode 502 and the lithium reservoir electrode (LRE) 509, such that none of the electrodes are electronically connected within the cell 500. The separator region 508 may include, for example, an electrolyte with a lithium cation, or another type of electrolyte, including any of the exemplary electrolytes described above with respect to the separator region 503. In this regard, the electrolyte with a lithium cation, or other type of electrolyte, included in the separator region 508 enables lithium-ion transfer between the lithium reservoir electrode (LRE) 509 and the working electrodes 501, 502.

During normal operation, the negative electrode terminal 501 and the positive electrode terminal 502 are connected to either end of a load during discharge, and to a power supply 510 during charge, and the lithium reservoir electrode (LRE) 509 may remain disconnected.

To replenish the capacity of the cell 500 lost due to side reactions, the circuit between the lithium reservoir electrode (LRE) 509 and one of the two working electrodes 501, 502 is closed so that electrons can flow through the circuit from the lithium reservoir electrode (LRE) 509 to the working electrode 501 or 502. Lithium ions are concurrently transferred ionically through the separator 508 from the lithium reservoir electrode (LRE) 509 to the working electrode 501 or 502, thus restoring the cell capacity to its original value.

To remove lithium from one of the working electrodes 501, 502 and store it in the lithium reservoir electrode (LRE) 509, a voltage may be applied between one of the working electrodes 501, 502 and the lithium reservoir electrode (LRE) 509 using a voltage supply 512, 511.

In this regard, the extent to which the working electrode 501 or 502 should be charged is determined so as to prevent overcharging of the working electrode. To determine this, the state of charge (SOC) of each working electrode 501, 502 is determined. The state of charge (SOC) of each working electrode 501, 502 corresponds to the amount of lithium contained in it. When the lithium concentration is at its maximum value, the state of charge (SOC) of the electrode is "1," and when the lithium concentration is at its minimum, the state of charge (SOC) of the electrode is a "0." The lithium reservoir electrode (LRE) 509 is used to increase or decrease the state of charge (SOC) of one or both of the working electrodes 501, 502 via the transfer of lithium ions and electrons. In one instance, the lithium reservoir electrode (LRE) 509 may be used as a reference electrode, as shown in FIG. 5, to estimate the open circuit potential (OCP) from which the state of charge (SOC) is determined. Alternatively, the state of charge (SOC) may be determined, as shown in FIG. 6 and described below, using a battery model and measurements of the full-cell potential and current.

In FIG. 5, the lithium reservoir electrode (LRE) 509 is used as a reference electrode, and the potential between the positive electrode terminal 502 and the lithium reservoir electrode (LRE) 509, and/or between the negative electrode terminal 501 and the lithium reservoir electrode (LRE) 509, is measured using a potentiometer. The open circuit potential (OCP) of each working electrode 501, 502 can be measured directly if the cell 500 is at open circuit and has achieved equilibrium. Alternatively, the open circuit potential (OCP) can be estimated based on the reference-electrode potential measurement and the history of the current passing through the cell 500. The state of charge (SOC) is then determined from the measured or estimated open circuit potential (OCP). A battery management system 515 controls the switches 513, 514 and the variable load resistors 517, 518 based on the determined state of charge (SOC). In particular, the battery management system 515 determines at what point to reopen the lithium reservoir circuit, and in what direction and at what rate the transfer of lithium should proceed at so as to prevent deposition of lithium at the negative electrode 501 or the positive electrode 502 during lithium insertion into the working electrodes or the formation of dendrites at the lithium reservoir electrode (LRE) 509 during lithium removal from the working electrodes. The battery management system 515 may control the direction of the lithium transfer by setting the direction of current between the working electrode and the lithium reservoir electrode (LRE) 509. The variable load resistors 517, 518 can be varied and are of sufficiently high resistance such that the transfer rate can be limited to low rates.

Figure 6:
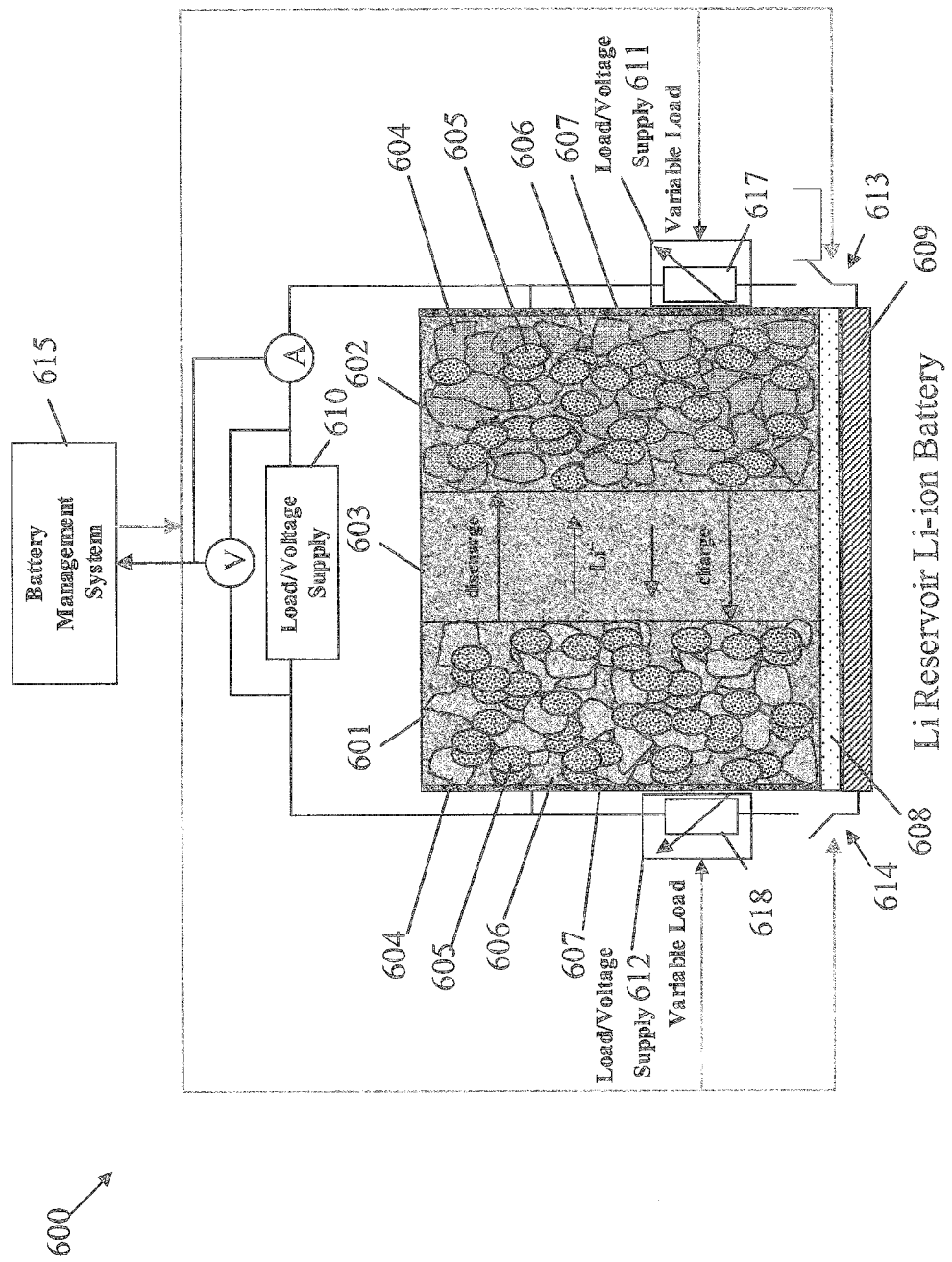
FIG. 6 shows an exemplary rechargeable lithium-ion cell, which includes a lithium reservoir electrode (LRE) not configured as a reference electrode.

FIG. 6 shows an exemplary rechargeable lithium-ion cell 600, which includes a lithium reservoir electrode (LRE) 609 not configured as a reference electrode. In addition to the lithium reservoir electrode (LRE) 609, the exemplary rechargeable lithium-ion cell 600 includes a negative electrode 601, a positive electrode 602, a separator region 603 between the negative electrode 601 and the positive electrode 602, and a separator region 608 between the working electrodes 601, 602 and the lithium reservoir electrode (LRE) 609.

The negative electrode 601 and the positive electrode 602 each contains active materials 604 into which lithium may be inserted. Hence, the active materials 604 are also referred to as lithium-insertion materials 604. With respect to the negative electrode 601, the active materials 604 may include, for example, graphite, disordered carbon, and/or lithium titanate. With respect to the positive electrode 602, the active materials 604 may include, for example, a transition metal oxide (e.g., lithium manganese oxide), and/or a lithium metal phosphate (e.g., lithium iron phosphate).

The negative electrode 601 and the positive electrode 602 each also includes inert materials 605, electrolyte 606 and a current collector 607. The inert materials 605 may include, for example, a polymeric binder (e.g., polyvinyldifluoride (PVDF)) and/or a carbon additive for conduction (e.g., acetylene black, graphite and/or carbon fiber). The electrolyte 606 may include, for example, Lithium Hexafluorophosphate (LiPF6) in a nonaqueous electrolyte, a cyclic carbonate (e.g., ethylene carbonate, propylene carbonate), a linear carbonate (e.g., dimethyl carbonate, ethyl methyl carbonate, diethyl carbonate), an organic solvent (e.g., acetonitrile), and/or a polymer electrolyte (e.g., polyethylene oxide). The current collector 607 may include, for example, copper for the negative electrode 601, and aluminum for the positive electrode 602. Additionally, the lithium reservoir electrode (LRE) 609 may be attached to a platinum wire current collector.

The separator region 603 between the negative electrode 601 and the positive electrode 602 serves as a physical barrier between the negative electrode 601 and the positive electrode 602 so that neither electrode is electronically connected within the cell 600. The separator region 603 includes, for example, an electrolyte with a lithium cation. The electrolyte may enable lithium ion transfer between the positive and negative electrodes 602, 601. If a liquid electrolyte is used, the separator region 603 may include, for example, polyethylene and/or polypropylene. If a solid electrolyte is used, the separator region 603 may include, for example, a polymer electrolyte. A gelled electrolyte (mixture of liquid and solid) may also be provided.

The separator region 608 between the working electrodes 601, 602 and the lithium reservoir electrode (LRE) 609 serves as a physical barrier between the negative electrode 601 and the lithium reservoir electrode (LRE) 609, and between the positive electrode 602 and the lithium reservoir electrode (LRE) 609, such that none of the electrodes are electronically connected within the cell 600. The separator region 608 may include, for example, an electrolyte with a lithium cation, or another type of electrolyte, including any of the exemplary electrolytes described above with respect to the separator region 603. In this regard, the electrolyte with a lithium cation, or other type of electrolyte, included in the separator region 608 enables lithium-ion transfer between the lithium reservoir electrode (LRE) 609 and the working electrodes 601, 602.

In FIG. 6, a model of the cell is used to deconvolute the state of charge (SOC) of one or both of the working electrodes 601, 602 using measurements of the full-cell potential and the current. The battery management system 615 includes the model and controls the switches 613, 614 and variable load resistors 617, 618 based on the determined state of charge (SOC). In particular, the battery management system 615 determines at what point to reopen the lithium reservoir circuit, and in what direction and at what rate the transfer of lithium should proceed at so as to prevent deposition of lithium at the negative electrode 601 or the positive electrode 602 during lithium insertion into the working electrodes or the formation of dendrites at the lithium reservoir electrode (LRE) 609 during lithium removal from the working electrodes. The battery management system 615 may control the direction of the lithium transfer by setting the direction of current between the working electrode and the lithium reservoir electrode (LRE) 609. The variable load resistors 617, 618 can be varied and are of sufficiently high resistance such that the transfer rate can be limited to low rates.

FIGS. 7A to 7C show how a replenishment of charge occurs from the lithium reservoir electrode 509/609 to the positive electrode 502/602. In particular, FIG. 7A shows the lithium-ion cell 500/600 in a discharged state, after side reactions, FIG. 7B shows the lithium-ion cell 500/600 with a closed electronic circuit applied between the lithium reservoir electrode (LRE) 509/609 and the positive electrode 502/602 of the lithium-ion cell 500/600, and FIG. 7C shows the renewed cell 500/600.

As shown in FIGS. 7A to 7C, the lithium reservoir electrode (LRE) 509/609 replaces the charge that was lost due to the side reactions, which were described, for example, in connection with FIG. 3. In this instance, the lithium reservoir electrode circuit corresponding to the positive electrode 502/602 is closed to allow electrons to flow from the lithium reservoir electrode (LRE) 509/609 to the positive electrode 502/602. Lithium dissolves from the lithium reservoir electrode (LRE) 509/609, and is transferred through the electrolyte in the separator region 508/608 to the positive electrode 502/602, where it is inserted via the main insertion reaction. The appropriate amount of charge to be transferred is determined by the battery management system 515/615 so that the cell 500/600 returns to its original capacity.

FIGS. 8A to 8D show how a removal of charge occurs from, for example, the positive electrode 501/602 to the lithium reservoir electrode 509/609. In particular, FIG. 8A shows the lithium-ion cell 500/600 in a discharged state, after side reactions, FIG. 8B shows the lithium-ion cell 500/600 in the discharged state after anode material loss, FIG. 8C shows the lithium-ion cell 500/600 in the discharged cell with voltage applied between the positive electrode 502/602 and the lithium reservoir electrode (LRE) 509/609 having a charge-transfer reaction, and FIG. 8C shows the rebalanced cell 500/600.

As shown in FIGS. 8A to 8D, the lithium reservoir electrode (LRE) 509/609 stores the excess charge removed from the positive electrode 502/602 in the event that active material in the negative electrode 501/601, for example, has been depleted. For the transfer of the lithium from the positive electrode 502/602 to the lithium reservoir electrode (LRE) 509/609, the lithium reservoir electrode circuit corresponding to the positive electrode 502/602 is closed and a voltage is applied to allow electrons to flow from the positive electrode 502/602 to the lithium reservoir electrode (LRE) 509/609.

Lithium dissolves from the positive electrode 502/602, and is transferred through the electrolyte in the separator region 508/608 to the lithium reservoir electrode (LRE) 509/609. The appropriate amount of charge to be transferred is determined by the battery management system 515/615 so that the cell 500/600 returns to a balanced state.

Figure 9:
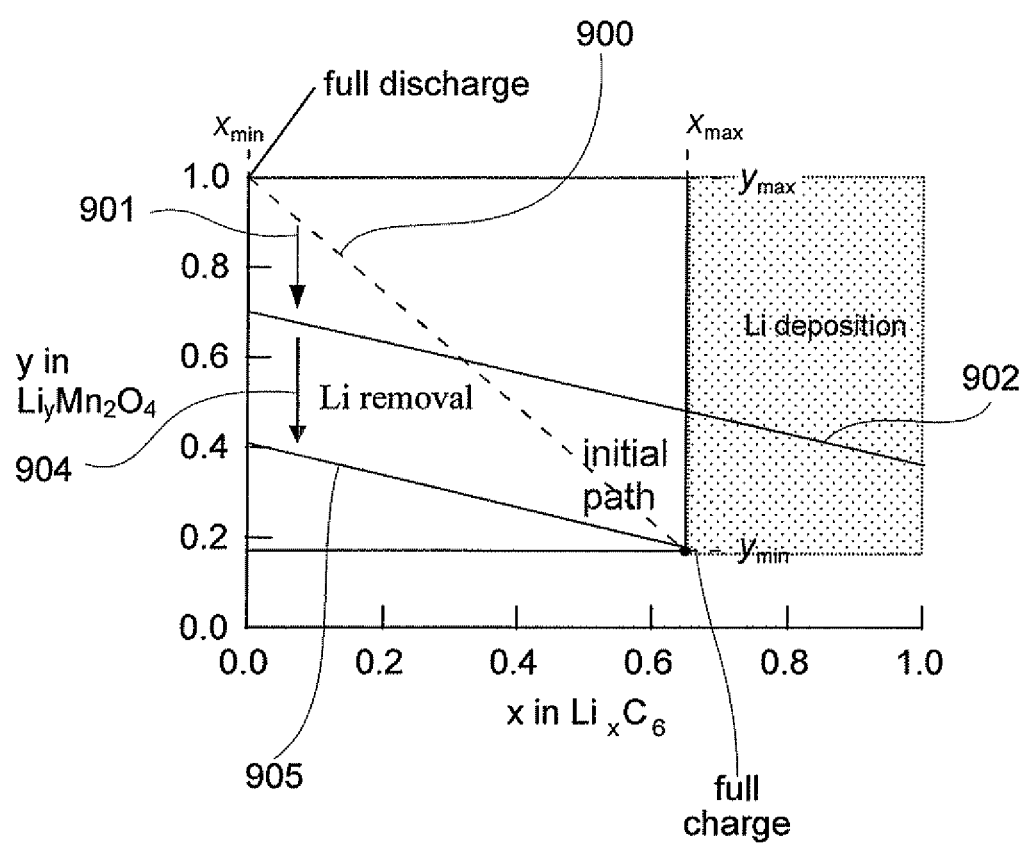
FIG. 9 is a graph plotting cycle paths for the exemplary lithium-ion cell and showing a change in the path due to removal of excess lithium from a working electrode.

FIG. 9 is a graph plotting the charge at the positive electrode 502/602 against the charge at the negative electrode 501/601 and showing an effect of the removal of the excess charge from the positive electrode 502/602.

In FIG. 9, an initial path 900 begins at $X_{min}, Y_{max}$ at a full discharge state and ends at $X_{max}, Y_{min}$ at a full charge state, where $X_{min}$ is the minimum average fraction of used lithium sites of an exemplary active material $Li_xC_6$ of the negative electrode 501/601, $X_{max}$ is the maximum average fraction of used lithium sites of the active material of the negative electrode 501/601 before detrimental lithium deposition begins to occur at the negative electrode 501/601, $Y_{max}$ is the maximum average fraction of used lithium sites of an exemplary active material $Li_yMn_2O_4$ of the positive electrode 502/602, and $Y_{min}$ is the minimum average fraction of used lithium sites of the active material of the positive electrode 502/602. A first shift 901 from initial path 900 to path 902 represents the active material loss at the negative electrode 501/601. Path 902 shows the need for a higher average fraction of used lithium sites than $X_{max}$ for insertion into the negative electrode 501/601 of all of the lithium from the positive electrode 502/602 during charge.

A second shift 904 from path 902 to path 905, which includes a translation between the paths 902 and 905 without any change between their slopes, represents the charge transfer from the positive electrode 502/602 to the lithium reservoir electrode (LRE) 509/609. With respect to the slope 905, the charge at $Y_{min}$ again coincides with $X_{max}$, so that lithium deposition at the negative electrode 501/601 may be avoided. Cell capacity is not lost by the charge transfer from the positive electrode 501/601 to the lithium reservoir electrode (LRE) 509/609 because the full safe capacity of the diminished negative electrode 501/601 would still be in use.

What is claimed is:

1. A method to adjust a lithium supply of a battery cell including a negative working electrode, a positive working electrode, and an auxiliary electrode, the method comprising:
    measuring an open circuit potential of each of the two working electrodes using the auxiliary electrode as a reference electrode during an equilibrium state of the working electrodes at open circuit;
    determining a state of charge of each of the two working electrodes based on the measured open circuit potential of each of the two working electrodes; and
    based on the determined state of charge:
        (a) transferring lithium from the auxiliary electrode to the positive working electrode over a path to which the negative working electrode is external; or
        (b) transferring lithium to the auxiliary electrode from at least one of the two working electrodes;
    wherein:
        the battery cell includes:
            a first separator region arranged between the two working electrodes to separate the two working electrodes so that none of the two working electrodes is electronically connected within the cell; and
            a second separator region arranged between the auxiliary electrode and the two working electrodes to separate the auxiliary electrode from the two working electrodes so that none of the two working electrodes is electronically connected to the auxiliary electrode within the cell;
        the two working electrodes are arranged to produce electrical energy output by the battery cell as a power source;
        each of the two working electrodes includes an active material, an inert material, an electrolyte, and a current collector; and
        the auxiliary electrode includes a lithium reservoir.

2. The method of claim 1, wherein the first separator region includes an electrolyte with a lithium cation.

3. The method of claim 1, wherein the second separator region includes an electrolyte with a lithium cation.

4. The method of claim 1, wherein:
    a power supply is connected to the current collector of each of the two working electrodes to charge the two working electrodes;
    a first electronic circuit connects the power supply to the current collector of each of the two working electrodes; and
    a second electronic circuit connects the current collector of at least one of the two working electrodes to the auxiliary electrode.

5. The method of claim 4, wherein the second electronic circuit includes:
    a variable load resistor and a switch connected in series between the current collector and the auxiliary electrode.

6. The method of claim 5, wherein a battery management system controls the variable load resistor and the switch.

7. The method of claim 6, wherein the battery management system determines the state of charge.

8. The method of claim 6, wherein the battery management system determines at what point to open the second electronic circuit, and a rate of transfer of lithium.

9. The method of claim 1, wherein the transfer of lithium accommodates loss of capacity due to a side reaction.

10. The method of claim 1, wherein the transfer of lithium reduces an excess supply of lithium in at least one of the two working electrodes.

11. The method of claim 1, wherein an electronic circuit connects at least one of the two working electrodes to the auxiliary electrode so that when the circuit is closed electrons flow from the auxiliary electrode to the at least one working electrode, and lithium ions flow concurrently through the second separator from the auxiliary electrode to the at least one working electrode.

12. The method of claim 11, further comprising:
    monitoring and controlling the transfer of lithium via a battery management system.

13. The method of claim 12, wherein the battery management system determines at what point to open the electronic circuit, and a rate of transfer of lithium from the lithium reservoir.

14. The method of claim 1, wherein lithium is transferred between the two working electrodes through the first separator region.

15. The method of claim 1, wherein the state of charge of each of the two working electrodes corresponds to an amount of lithium contained in each of the two working electrodes.

16. The method of claim 1, wherein the two working electrodes are subjected to charge and discharge cycles during which electrons and lithium ions flow between the two working electrodes.

17. The method of claim 1, wherein:
the active material of the negative electrode includes at least one of graphite, disordered carbon, and lithium titanate; and
the active material of the positive electrode includes at least one of a transition metal oxide and a lithium metal phosphate.

18. The method of claim 17, wherein the transition metal oxide includes lithium manganese oxide.

19. The method of claim 17, wherein the lithium metal phosphate includes lithium iron phosphate.

20. The method of claim 1, further comprising:
closing an electronic circuit connecting the at least one working electrode to the auxiliary electrode; and
applying a voltage to the circuit to provide a current polarized such that electrons flow from the at least one working electrode to the auxiliary electrode, and lithium ions flow concurrently through the second separator from the at least one working electrode to the auxiliary electrode.

21. The method of claim 1, wherein the adjustment of the lithium supply includes one of replenishment of a diminished supply and removal of an excess supply of lithium in the working electrodes.

22. The method of claim 1, wherein the transfer of lithium accommodates loss of active material of the at least one of the working electrodes.

23. The method of claim 1, wherein the transferring is done from the auxiliary electrode and to the at least one of the working electrodes for replenishment of a diminished supply of lithium.

24. The method of claim 1, wherein the transferring is done to the auxiliary electrode and from the at least one of the working electrodes for removal of an excess supply of lithium.

25. The method of claim 1, wherein the transferring is done both (a) to the auxiliary electrode and from at least one of the working electrodes, and (b) from the auxiliary electrode and to at least one of the working electrodes.

26. The method of claim 1, wherein the adjustment of the lithium supply includes removal of an excess supply of lithium in the at least one of the working electrodes.

27. The method of claim 1, wherein the transferring based on the determined state of charge is between the auxiliary electrode and the positive working electrode.

28. The method of claim 27, wherein the adjustment of the lithium supply includes one of replenishment of a diminished supply and removal of an excess supply of lithium in the working electrodes.

29. The method of claim 27, wherein the transfer of lithium accommodates loss of active material of at least one of the working electrodes.

30. The method of claim 27, further comprising:
closing an electronic circuit connecting at least one of the working electrodes to the auxiliary electrode;
applying a voltage to the circuit to provide a current polarized such that electrons flow from the at least one of the working electrodes to the auxiliary electrode, and lithium ions flow concurrently through the second separator from the at least one of the working electrodes to the auxiliary electrode.

31. The method of claim 27, wherein the transferring is done from the auxiliary electrode and to at least one of the working electrodes for replenishment of a diminished supply of lithium.

32. The method of claim 27, wherein the transferring is done to the auxiliary electrode and from at least one of the working electrodes for removal of an excess supply of lithium.

33. The method of claim 27, wherein the transferring is done both (a) to the auxiliary electrode and from at least one of the working electrodes, and (b) from the auxiliary electrode and to at least one of the working electrodes.

34. The method of claim 27, wherein the adjustment of the lithium supply includes removal of an excess supply of lithium in at least one of the working electrodes.

35. The method of claim 27, wherein the first separator region includes an electrolyte with a lithium cation.

36. The method of claim 27, wherein the second separator region includes an electrolyte with a lithium cation.

37. The method of claim 27, wherein:
a power supply is connected to the current collector of each of the two working electrodes to charge the two working electrodes;
a first electronic circuit connects the power supply to the current collector of each of the two working electrodes; and
a second electronic circuit connects the current collector of at least one of the two working electrodes to the auxiliary electrode.

38. The method of claim 31, wherein the second electronic circuit includes:
a variable load resistor and a switch connected in series between the current collector and the auxiliary electrode.

39. The method of claim 38, wherein a battery management system controls the variable load resistor and the switch.

40. The method of claim 39, wherein the battery management system determines the state of charge.

41. The method of claim 1, wherein:
the method replenishes lithium-ion capacity of the battery cell; and
the transferring of the lithium is from the auxiliary electrode to the positive electrode.

42. The method of claim 41, wherein one of the working electrodes is in a first layer, another of the working electrodes is in a second layer, and the second separator region extends between the first and second layers.

43. A method to adjust a lithium supply of a battery cell including two working electrodes and an auxiliary electrode, the method comprising:
measuring an open circuit potential of each of the two working electrodes using the auxiliary electrode as a reference electrode during an equilibrium state of the working electrodes at open circuit;
determining a state of charge of each of the two working electrodes based on the measured open circuit potential of each of the two working electrodes; and
transferring lithium to the auxiliary electrode from at least one of the two working electrodes based on the determined state of charge;
wherein:
the battery cell includes:
a first separator region arranged between the two working electrodes to separate the two working electrodes so that none of the two working electrodes is electronically connected within the cell; and
a second separator region arranged between the auxiliary electrode and the two working electrodes to separate the auxiliary electrode from the two working electrodes so that none of the two working electrodes is electronically connected to the auxiliary electrode within the cell;
the two working electrodes include a negative electrode and a positive electrode;
each of the two working electrodes includes an active material, an inert material, an electrolyte, and a current collector; and
the auxiliary electrode includes a lithium reservoir.

44. The method of claim 43, wherein the negative working electrode is arranged external to a path of the lithium transfer.

45. The method of claim 43, further comprising:
closing an electronic circuit connecting at least one of the working electrodes to the auxiliary electrode;
applying a voltage to the circuit to provide a current polarized such that electrons flow from the at least one of the working electrodes to the auxiliary electrode, and lithium ions flow concurrently through the second separator from the at least one of the working electrodes to the auxiliary electrode.

46. The method of claim 43, wherein the transferring is done both (a) to the auxiliary electrode and from at least one of the working electrodes, and (b) from the auxiliary electrode and to at least one of the working electrodes.

47. The method of claim 43, wherein the adjustment of the lithium supply includes removal of an excess supply of lithium in at least one of the working electrodes.

48. The method of claim 43, wherein the first separator region includes an electrolyte with a lithium cation.

49. The method of claim 43, wherein the second separator region includes an electrolyte with a lithium cation.

50. The method of claim 43, wherein:
a power supply is connected to the current collector of each of the two working electrodes to charge the two working electrodes;
a first electronic circuit connects the power supply to the current collector of each of the two working electrodes; and
a second electronic circuit connects the current collector of at least one of the two working electrodes to the auxiliary electrode.

51. The method of claim 50, wherein the second electronic circuit includes:
a variable load resistor and a switch connected in series between the current collector and the auxiliary electrode.

52. The method of claim 51, wherein a battery management system controls the variable load resistor and the switch.

53. The method of claim 52, wherein the battery management system determines the state of charge.

54. The method of claim 44, wherein the transfer of the lithium is from the positive working electrode.

* * * * *